(12) United States Patent
Artz et al.

(10) Patent No.: US 6,852,272 B2
(45) Date of Patent: Feb. 8, 2005

(54) METHOD FOR PREPARATION OF METALLIC AND CERAMIC FOAM PRODUCTS AND PRODUCTS MADE

(75) Inventors: Gregory Artz, Tucson, AZ (US); K. Ranji Vaidyanathan, Tucson, AZ (US); Michael L. Fulcher, Tucson, AZ (US); Mark J. Rigali, Tucson, AZ (US); John L. Lombardi, Tucson, AZ (US); Joseph Walish, Miami, AZ (US); Ronald A. Cipriani, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 10/351,693

(22) Filed: Jan. 27, 2003

(65) Prior Publication Data

US 2003/0180171 A1 Sep. 25, 2003

Related U.S. Application Data

(63) Continuation-in-part of application No. 10/094,098, filed on Mar. 7, 2002, now Pat. No. 6,524,522.
(60) Provisional application No. 60/274,075, filed on Mar. 7, 2001.

(51) Int. Cl.[7] .................................................. B22F 3/11
(52) U.S. Cl. ............................... 419/2; 419/41; 75/228; 264/44; 264/45.9
(58) Field of Search ............................... 75/228; 419/2, 419/41; 264/44, 45.9

(56) References Cited

U.S. PATENT DOCUMENTS

| | | | |
|---|---|---|---|
| 2,310,061 A | | 2/1943 | Bowen |
| 3,050,967 A | | 9/1962 | Fischer |
| 3,087,807 A | | 4/1963 | Allen et al. |
| 4,196,267 A | | 4/1980 | Watanabe et al. |
| 4,664,883 A | * | 5/1987 | Melody et al. ................. 419/2 |
| 4,889,670 A | | 12/1989 | Gurak et al. |
| 5,151,246 A | | 9/1992 | Baumeister et al. |
| 5,393,485 A | | 2/1995 | Worz et al. |
| 5,846,664 A | * | 12/1998 | Third et al. ................. 428/550 |
| 5,848,351 A | * | 12/1998 | Hoshino et al. ............. 428/550 |
| 5,930,580 A | * | 7/1999 | Everett ........................... 419/2 |
| 5,935,514 A | | 8/1999 | Ford, Jr. et al. |
| 5,976,454 A | | 11/1999 | Sterzel et al. |
| 5,998,317 A | | 12/1999 | Sterzel |
| 6,171,532 B1 | | 1/2001 | Sterzel |
| 6,254,998 B1 | | 7/2001 | Tuchinsky |
| 6,410,160 B1 | * | 6/2002 | Landin et al. .............. 428/613 |
| 6,444,007 B1 | | 9/2002 | Knott et al. |
| 6,524,522 B2 | * | 2/2003 | Vaidyanathan et al. ......... 419/2 |
| 6,565,797 B2 | * | 5/2003 | Miyakawa et al. .......... 264/628 |
| 6,660,224 B2 | * | 12/2003 | Lefebvre et al. ............... 419/2 |
| 2001/0023027 A1 | | 9/2001 | Seeliger et al. |
| 2002/0053542 A1 | * | 5/2002 | Miyakawa et al. ...... 210/510.1 |
| 2002/0112838 A1 | | 8/2002 | Frommeyer et al. |
| 2002/0121157 A1 | | 9/2002 | Knott et al. |

FOREIGN PATENT DOCUMENTS

WO  WO 01/54846  8/2001

OTHER PUBLICATIONS

T. Daxner, H.J. Böhm, and F.G. Rammerstorfer, "Mesoscopic Simulation of Inhomogenous Metallic Foams with Respect to Energy Absorption," *Computational Materials Science* 16, pp. 61–69 (1999).

Mark A. Janney, Stephen D. Nunn, Claudia A. Walls, Ogbemi O. Omatete, Randy B. Ogle, Glen H. Kirby, and April D. McMillan, "Geleasting," *The Handbook of Ceramic Engineering*, 1998.

T.J. Lu, H.A. Stone and M.F. Ashby, "Heat Transfer in Open–Cell Metal Foams," *Acta Mater.*, vol. 46, No. 10, pp. 3619–3635 (1998).

S. Santosa and T. Wierzbicki, "On the Modeling of Crush Behavior of a Closed–Cell Aluminum Foam Structure," *J. Mech. Phys. Solids*, vol. 46, No. 4, pp. 645–669 (1998).

S.P. Santosa, T. Wierzbicki, A.G. Hanssen and M. Langseth, "Experimental and Numerical Studies of Foam–Filled Sections," *International Journal of Impact Engineering* 24, pp. 509–534 (2000).

PCT International Search Report mailed Jun. 18, 2003.

* cited by examiner

*Primary Examiner*—Ngoclan T. Mai
(74) *Attorney, Agent, or Firm*—Banner & Witcoff, Ltd.

(57) ABSTRACT

The present invention relates to the fabrication of low cost, in situ, porous metallic, ceramic and cermet foam structures having improved mechanical properties such as energy absorption and specific stiffness. Methods of fabricating the structures from compositions including ceramic and/or metallic powders are provided. The flowable compositions also include an immiscible phase that results in pores within the final structure. Furthermore, the structures may be shaped to have external porosity, such as with mesh-like structures.

37 Claims, 6 Drawing Sheets

METHOD FOR PREPARATION OF METALLIC AND CERAMIC FOAM PRODUCTS AND PRODUCTS MADE

CROSS-REFERENCE TO RELATED APPLICATION

This application is a continuation-in-part of U.S. application Ser. No. 10/094,098, filed Mar. 7, 2002, now U.S. Pat. No. 6,524,522, and entitled "Method for Preparation of Metallic Foam Products and Products Made." Further, this application is based on, and claims the benefit of, co-pending U.S. Provisional Application No. 60/274,075, filed on Mar. 7, 2001, and entitled "Extrusion Freeform Fabrication Method for Metallic Foam Components Having Oriented Microstructures and Improved Mechanical Properties," which is incorporated herein by reference.

The present invention was made with U.S. Government support under grant Numbers DAAD19-00-C-0025 and DAAD19-01-C-0054 awarded by the United States Army. Accordingly, the Government may have certain rights in the invention described herein.

FIELD OF THE INVENTION

The present invention relates to the fabrication of low cost, in situ, metallic foam components having oriented microstructures and improved mechanical properties such as energy absorption and specific stiffness. The present invention also relates to the fabrication of low cost, in situ, ceramic and, cermet foam components with improved mechanical properties.

BACKGROUND OF INVENTION

Cellular materials have been available for decades, but new opportunities for cellular materials are emerging. Novel manufacturing approaches have beneficially affected performance and cost. Additionally, higher levels of basic understanding about mechanical, thermal and acoustic properties have been developed. These provide an integrated pathway between manufacturing and design.

Cellular materials have high stiffness and yield strength at low density relative to other competing materials and systems. That is, the cellular materials may be laminated between opposed sheets of another material. This creates an opportunity for ultra-light structures, with integrally bonded dense face sheets. In addition, cellular materials have large compressive strains achievable at nominally constant stress. Metallic foams provide for high-energy absorption capacity which is advantageous in crash and blast amelioration systems. These materials may be used effectively for either cooling or heat exchange structures. Cellular materials incorporated within a design to form sandwich skins can provide the desired mechanical properties in a cost-effective manner as compared to alternative structures.

One method of making metallic foams involves gas expansion in foam casting. Another method for making metallic foams is based on gas expansion in foam casting or powder metallurgy. According to this method, metal powder is mixed with a foaming agent, for example a gas. Gas pressure is derived by either a dispersed particulate such as $H_2$ from $TiH_2$, high pressure generated within an entrapped inert gas, or a gas injected into a liquid metal. This mixture can then be extruded or cast into the structural shape required. It is very difficult to control pore size or orientation using these known techniques.

The powder metallurgical Fraunhofer-process is another method used to create metallic foams. In this method, a foaming agent is added to a metal powder that is then mixed. This mixture can then be compacted or extruded into sheets or bars that can then be formed into the component shape using conventional molding techniques. Again, this process has little control of the pore size or orientation. Furthermore, this method can be cost-prohibitive if used to create geometrically complex parts due to the molds required.

Recently, processes have been developed to attempt to address the problem of lack of control of pore shape and orientation. However, this process, referred to as the GASAR process, involves the use of molten metals and the injection of gases, and is therefore, technically complex and expensive. Furthermore, the GASAR process allows the use of only one pore or cell orientation in a component and the shapes of the components are generally limited to plates, rods, and tubes.

Methods of making ceramic foams and cermet foams, which contain both metallic and ceramic materials, encounter similar difficulties. Such methods are extremely complex and do not produce products with predictable quality or predictable porosity. Further, prior cermet foams utilize a foaming agent, and thus both the shape and the amount of porosity can not be controlled. As a result, it is difficult to make foams that have consistent mechanical properties. Additionally, the manufacture of complex shaped foams using those methods is not feasible.

While others have developed processes for the fabrication of metallic foam structures with oriented porosity, none of those processes are capable of creating a combination of open and closed cell porosity, nor are they capable of creating components directly from CAD designs. Additionally, control of pore size and pore orientation is difficult. Moreover, conventional processes do not provide for the fabrication of integral structures with a metallic foam skin in a cost-effective manner. Consequently, there is a need for a fabrication process that can produce complex metallic foam components with optimized dynamic mechanical properties in a cost-effective manner.

Further, there is a need to fabricate metallic foam structures that have both open and closed cell porosity. Open porosity is characterized by the amount of surface area that is accessible by a gas or liquid if the structure were to be immersed in it, while closed porosity is the porosity in the structure not accessible to a gas or liquid. The size, distribution, and aspect ratio of close-celled porosity in a foamed material can have a direct effect on its energy absorbing and blast amelioration capability and other mechanical properties such as compressive strength.

In addition, there is a need to fabricate foam structures using ceramic materials or combinations of metallic and ceramic materials. There is a need for a fabrication process that can produce complex ceramic and cermet foam components with optimized dynamic mechanical properties in a cost-effective manner.

SUMMARY OF THE INVENTION

The present invention overcomes the problems encountered with conventional methods and compositions by providing efficient, cost-effective processes for preparing complex metallic, ceramic and cermet foam components with optimized dynamic mechanical properties. More specifically, the invention provides methods and compositions for metallic, ceramic and cermet foam components. In particular, the present invention relates to the freeform fabrication of metallic, ceramic, and cermet foams to form parts having complex geometries and that demonstrate superior mechanical properties and energy absorbing capacity.

Metallic foam components can be used in a wide range of applications, for example, applications such as antenna masts and fins, wings, exhaust ducts, electronic chassis components, and ribbed heat diffusers for state of the art lighting fixtures. Ceramic and cermet foams can be used in a wide variety of applications including wear resistance applications, like high temperature seals and similar applications.

Further, the present invention provides cost-effective methods of producing ultra-lightweight structures directly from CAD designs and offers the ability to manufacture complicated shape prototypes with minimal post-processing steps. In addition, the present invention provides methods and compositions for forming foam structures that have both open and closed cell porosity. The porous nature of the structures enhances their energy absorbing and blast amelioration capability and other mechanical properties such as compressive strength.

Accordingly, an object of the present invention is to fabricate metallic, ceramic, and cermet foam components with optimized mechanical properties in an efficient, cost-effective manner.

Another object of the present invention is to fabricate metallic, ceramic, and cermet foam components that display increased energy absorbing and other mechanical properties based on the foam having open and closed porosity.

DETAILED DESCRIPTION OF INVENTION

The present invention relates to compositions and processes that enable the manufacture of low cost, in situ, metallic, ceramic, and cermet foam components having improved mechanical properties such as energy absorption and specific stiffness. The invention is not material specific, and it can be used with a wide range of metals, alloys, ceramics, and combinations thereof. Further, the present invention relates to foam composites having oriented microstructure that are manufactured according to the present method.

Generally, foam structures are fabricated from compositions that include a major phase, which includes inorganic powder and a binder. The inorganic powder of the major phase is selected as the starting material for the foam bodies made in accordance with the present invention. Generally, the powder is sinterable. Suitable inorganic powders include metallic, ceramic, or combinations of metallic and ceramic powders. The composition also includes a minor phase, which is a compound that is generally immiscible with the binder and generally non-reactive when mixed with the inorganic powder. The desired object is fabricated from the composite blend and finished to create the foam object.

Any metal or metal alloy powder can be used in this invention. Metals and alloys that can be used include, but are not limited to, Al, Cu, Mg, Sn, Ti, Zn, Co, Ni, Mo, Nb, and the like, and combinations including alloys thereof. Composites and pre-alloyed powders can also be used, including stainless steel, Ti64 (Ti—6Al—4V), and numerous others. A preferred alloy contains aluminum powder with Cu, Si, Sn, and/or Mg, such as a composition containing aluminum and 6.39 wt % Mg and 6.72 wt % Sn. Another preferred alloy blend contains aluminum and 4 wt % Cu alloy. Use of a eutectic alloy composition enhances the sinterability of the composition by making it easier to break the oxide layer on top of the aluminum powder. Additionally, the sintering temperature of the composition is reduced. Furthermore, the eutectic compositions provide higher strength aluminum alloys compared to pure aluminum thus, making it possible to obtain metallic foam components with better energy absorption capability.

Further, the inorganic powder can also be ceramic powder. Ceramic powders that can be used include, but are not limited to any carbide, nitride or oxide compound such as SiC, $Si_3N_4$, alumina, $ZrO_2$, ZrC, HfC, Si—Al—O—N, WC—Co, and the like, and combinations thereof.

Combinations of metallic and ceramic powder may be used to fabricate cermet foams. As used herein, "cermet" refers to compositions that include both ceramic and metallic powders. Any thermodynamically compatible metallic and ceramic powders, including the previously listed ceramic and metallic powders, can be combined to fabricate cermet foams.

The concentrations of the inorganic powders typically are between about 55% to about 96% by weight of the foam composition to provide final bodies having generally appropriate structural strength. Lower concentrations may be used, however, as the powder concentration decrease, it is expected that structural strength also may decrease. More typically, powder concentrations are between about 70% to about 90% by weight of the foam composition, and even more typically between about 75% to about 85% by weight of the foam composition.

Particle sizes for ceramic powders are generally between about 0.1 to about 45 μm, with preferred particle sizes between about 1 to about 10 μm. Particle sizes for metallic powders are generally between about 1 to about 45 μm, with preferred particle sizes between about 20 to about 45 μm. While generally any particle size may be used, smaller particle sizes provide enhanced finishing of the formed structures by limiting the amount of shrinkage that may occur during binder burnout and sintering.

The binder of the of the major phase functions to suspend the metallic, ceramic or cermet powder and provide a flowable composition. Preferably, thermoplastic and thermoset polymer binders may be used, and are selected based on several factors, including the powder used, the desired processing to create and finish the desired object, etc. The amount of polymer binder needed will depend n the density of the ceramic, metallic, or cermet powder. Preferably, the mixture contains binder in an amount from about 40% to about 60% by volume, and more preferably from about 45% to about 50% by volume based on the foam composition. The polymer binder may be selected to be compatible with use in an injection molding process, extrusion, or gel casting processes.

Thermoplastic polymer binders that can be used include, but are not limited to, PMMA (polymethyl methacrylate), EVA (ethyl vinyl acrylate), EEA (polyethylene ethacrylate), PEOx (poly-2-ethyl-2-oxazoline), PEG (polyethylene glycol), polystyrene, microcellulose, and the like, and combinations thereof. Thermoset polymer binders that can be used include, but are not limited to, BLO (butrylactone, which is commercially available from Aldrich Chemical Company in Milwaukee, Wis.), HODA (hexanedioldiacrylate, which is also commercially available from Aldrich Chemical Company in Milwaukee, Wis.), and the like and combinations thereof.

The minor phase compound is selected to be removable during the finishing stages to provide pores in the structure. The minor phase is mixed with the major phase, and when subsequently removed, correspondingly shaped pores remain within the structure. Blending of the major and minor phases need not be uniform. The minor phase may be present in the foam composition as a plurality of discrete droplets or other regular or irregular shapes of either generally uniform or varying sizes. The minor phase compound can be any compound that remains generally immiscible with the polymer binder and metallic, ceramic, or cermet powder when blended together. Further, it should be generally non-reactive with the metallic, ceramic, or cermet powder.

The minor phase compound can be a polymer binder selected from those polymers binders previously listed, as long as it is generally not miscible with the first polymer binder used in the blend. The minor phase compound also can be a polymer-immiscible material including, but not limited to, camphor, xylene, butyl oleate, and foaming agents such as carbamide (urea), ammonium hydrogen carbonate, and titanium dihydride. Examples of combinations of polymer binders that can be used include polystyrene and PEOx, microcellulose and PMMA, and PMMA and xylene. Examples of major and minor phases for an aluminum foam composition include PEOx with polystryene, and PMMA with titanium dihydride. Examples for a stainless steel foam composition include PPMA with polyethylene glycol and PMMA with ammonium hydrogen carbonate. Further, the minor phase compound can be microspheres, or microballoon particles. The microspheres can be polymer or ceramic microspheres. For example, polyacryonitrile microballoon particles such as Micropearl™ from Matsumoto Yushi-Seiyaku Co., which is available in various grades such as 30, 50, 80, 100, and 120 μm can be used. Ceramic microspheres, such as silica microspheres from PQ Corporation, $SiO_2$ or $Al_2O_3$ also can be used. Generally, ceramic microspheres are available as hollow spheres, where the hollow center of the sphere becomes a pore within the structure without additional processing such as burn out of a polymer. Any suitable size of microspheres, and combinations of sizes and types of microspheres can be used to obtain the desired pore size and amount of closed porosity.

Typically, the major phase is present in an amount in excess of the minor phase, with the ratio of the major and minor phase based at least in part on the components of the blend. For example, with certain blends it may be desirable to use approximately twice as much or more (by volume) of the major phase. With other compositions, such as where carbamide, titanium dihydride or ammonium hydrogen carbonate are used as the minor phase, a smaller amount is needed for the minor phase, typically less than 1% by volume of the total blend. When microspheres are used as the minor phase, the amount used depends on the amount and size of porosity desired in the final structure, which is typically between about 20 to about 70 volume percent of the component part depending on the application, though other porosities are possible. By way of example, to achieve about 20% porosity of the finished structure, about 0.0085 g of microspheres per gram of slurry is required.

Depending on the major and minor phase materials chosen for the blend, additional processing aids may be added. When a thermoplastic binder system is used, a compatibilizer or surfactant may be added to achieve high solids loading, to disperse the powder more effectively, and to reduce the viscosity of the mixture. Various compatibilizers may be used including, polyethylene glycol, stearic acid, xylene, and butyl oleate, or other additives like Al 3 wax and the like and combinations thereof may be used. In the case of a thermoset binder system, a dispersant is typically added in order to achieve high solids loading and to reduce the viscosity of the mixture. It also acts as a compatiblizer for the various components and reduces the viscosity of the composition. Various dispersants may be used including, but not limited to, organophosphate esters such as MAPHOS™ 8135, which is commercially available from BASF Corporation in Folcroft, Pa., and phosphate esters, such as PS-2 and the like.

A sintering aid can also be added. For example, ceramics typically have very high melting points, and the sintering aid is typically chosen based on the melting point of the ceramic material. For example, when the composition includes SiC or $Si_3N_4$, sintering aids including, but not limited to, yttrium, alumina, ceria ($Ce_2O_3$), other rare earth oxides, and the like, or combinations thereof may be used. Further, when the composition includes WC, alumina and similar materials may be used as a sintering aid. Sintering aids that can be used in cermet formulations include, but are not limited to metals like Ni, Mo, Nb, and the like, and combinations thereof.

Furthermore, other additives to enhance the mechanical properties of the desired object may be added. The additive is typically chosen to be thermodynamically compatible with the blend. For example, to increase the wear resistance, MoC, $SiO_2$, MoC, NiC, WC, HfC and FeC, and the like, and combinations thereof may be added.

The composite blends are prepared by melting the binder and mixing with the inorganic powder and the minor phase. A high shear mixer, such as a Brabender high-shear mixer, may be used. In order to ensure desired homogeneity of the blend, the material may be rebatched (material is removed from the mixing head, the mixing head is cleaned, and the material is put back into the head for further mixing). Upon completion of the rebatching, the blend is allowed to cool and then taken out of the mixing head. In one aspect, the binder and powder are mixed to provide a flowable composition. Mixing of the minor phase compound and flowable composition is incomplete so that the minor phase compound remains as discrete droplets or portions within the flowable composition and does not become uniformly blended with the powder.

To form the structures, the composite blend can be processed using any known process, such as, for example, low-pressure injection molding for thermoplastic binders, gel casting for thermoset binders, or ribbon or filament deposition processes. In one embodiment, an extrusion freeform fabrication (EFF) process for forming three-dimensional objects is used to provide the foam structures. An EFF process can be adapted to allow for rapid fabrication of functional components from the composite blends of the present invention. Such a process allows for the sequential deposition of multiple layers of the compositions to form complex-shaped structures, as desired. Preferably, the process equipment includes a fabrication modeler fitted with a high-pressure extrusion head to allow for extrusion of the highly viscous polymer systems of the present invention. For example, any commercially available rapid prototyping system such as a Stratasys Fused Deposition Modeling Device, can be adapted to use a high-pressure extrusion head, which assists in extruding the highly viscous foam compositions. Other methods that include high-pressure extrusion or otherwise allow the typically viscous composite blend to be deposited in a predetermined manner to form the desired structures may be used.

Generally, a pre-formed feed rod is prepared from the composition and passed to the extrusion apparatus. The feed rod is passed through an extrusion apparatus where an extrusion head of the apparatus deposits the extruded composition onto a work or support surface. Alternatively, the components of the composition, including polymer materials and additives, can be passed directly to the apparatus for a continuous process. The ribbons or filaments of extruded material generally are deposited layer upon layer onto the work or support surface in a predetermined pattern to form an object of the desired shape and size and having the desired porosity characteristics. Preferably, the extruded material is deposited so that the longitudinal axis of the extruded material is generally parallel to the work surface.

Depending upon the particular processing conditions employed, the minor phase of the polymer binder blend may become deformed when subjected to shear conditions. Without wishing to be bound by any theories, the amount of deformation experienced by these droplets is a function of the shear stress rate imparted to the blend, the viscosity of the individual polymers constituting the blend, and the diameter of the minor phase material. Therefore, the high-pressure extruder head is preferred in order to be able to extrude high polymer binder content viscous systems while being able to maintain a predetermined alignment of the minor-phase fibril in the extrusion direction.

A relationship detailing the elongation of a minor phase droplet in a polymer blend when subjected to shear stress is as follows:

$$\epsilon(t) = \chi I(t)(19\lambda+16)/(16\lambda+16), \text{ where}$$

$\epsilon(t)$: droplet elongation as a function of time
$\lambda$: ratio of major phase to minor phase of apparent polymer shear viscosities
$\chi$: $\sigma d/\gamma$; shear stress($\sigma$)*droplet diameter (d)/interfacial tension ($\gamma$)
$I(t)$: time dependent integral: $1-\exp(-40\epsilon' t/19\lambda_\chi)$, where $\epsilon'$ is the deformation rate As this relationship demonstrates, these factors are strongly dependent upon blend extrusion conditions. The polymer component viscosity and interfacial tensions are influenced by extrusion temperature, while shear stress imparted to the blend increases with extrusion pressure and decreased extruder orifice diameter. Initial (quiescent) droplet diameter of the minor blend component is dependent upon the relative concentration of the minor phase in the blend. The morphology of these droplets is therefore strongly influenced by the amount of shear imparted to the polymer.

Figure 1:
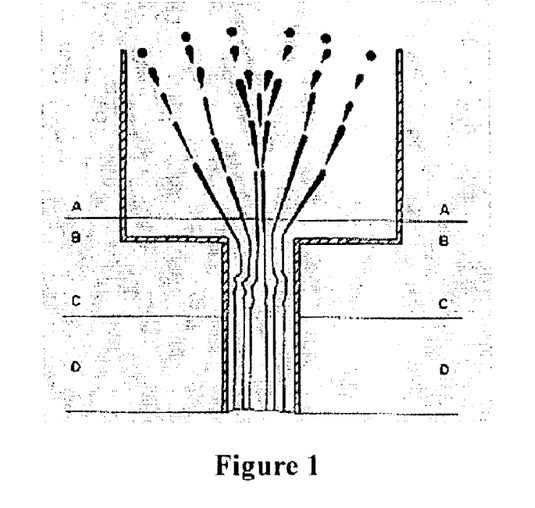
FIG. 1 is a schematic describing the fibrillation of a composite polymer blend through an extrusion orifice in accordance with the present invention.

The minor phase is typically present as discrete droplets or particles dispersed in the major phase. Such a dispersion is a type of microstructure that is typically encountered in blends composed of two immiscible phases, where the minor phase adopts a spherical morphology to minimize its surface area and energy. During extrusion, the minor phase may become aligned, e.g. elongated and positioned, in the direction of extrusion. When a blend is initially stressed, the spherical droplets of the minor phase become elongated into an ellipsoidal geometry. Increased stress causes the ellipsoids to become oriented with their major axes generally parallel to the polymer extrusion direction. These ellipsoids become elongated into long continuous fibrils which are oriented generally parallel to the flow direction. The transition between spherical minor phase to ellipsoids and subsequent fibrillation while extruding a composite blend through a nozzle is illustrated in FIG. 1.

The minor phase undergoes fibrillation when subjected to high shear extrusion through the high-pressure extrusion head. Preferably, this shear force aligns the minor phase along the extrusion direction as the feed rod passes through the orifice of the high-pressure extrusion head. Because the high-pressure extrusion head allows the orientations of the fibrils to be manipulated, a tailored microstructure with predetermined material properties will result. Accordingly, the extrusion head provides the ability to tailor the microstructure.

Depending on the materials used, extrusion temperatures can vary widely, for example from about 70° C. to about 400° C. The extrusion temperature is dependent at least in part on the melting temperature of the binder system and the particle size distribution of the powder. For example, for an EEA binder, the composite blend can typically be extruded at temperatures between about 125–150° C., though others blends may require different temperatures.

After passing through the high-pressure extrusion head, the extruded composite blend is deposited in a controlled manner onto a working surface. If desired, the extruded composite blend may then be formed into parts forming a final component directly from CAD designs. It is thus desirable that the system has hardware capable of processing CAD drawings so that the form, such as a mesh-like structure, can be built by a rapid prototyping process. The extruded composite blend can be used to fabricate parts in a layer-wise fashion by the sequential stacking of discrete extruded raw material layers upon each other until the final component part is formed. Each layer has a geometry corresponding to a horizontal cross section of the desired prototype. In this manner, geometrically complex parts are manufactured with complex and varying orientations of microstructure. Preferably, the composite blend is deposited in such a way as to provide a mesh-like or similar structure having the desired overall geometry. The mesh-like formation of the structure, as compared to a solid structure, provides an additional level of porosity in the structure.

In another embodiment of this invention, inorganic powders and polymer binder are mixed to create a slurry. A ball mill or similar mixing apparatus can be used to mix the ingredients to create the slurry. When a polymer binder such as HODA or BLO is used, the inorganic powder is preferably added in batches to the slurry. Typically, a dispersant is added, and a sintering aid may also be added depending on the materials used. The minor phase compound is also added to the slurry. The desired component part or structure can be created from the slurry by any suitable method, including gel casting, injection molding, and the like. Additional processing aids also can be added to the slurry depending on the selected fabrication method. For example if gel casting in a mold is used, a sufficient amount of a gelling agent or initiator to gel or cure the mixture is added to the mixture before it is poured into the mold. After the foam composition gels in the mold, the gelled part can be removed from the mold for binder burnout and sintering. Material densification and consolidation of the part is achieved through binder burnout and sintering or similar processes.

Figure 2:
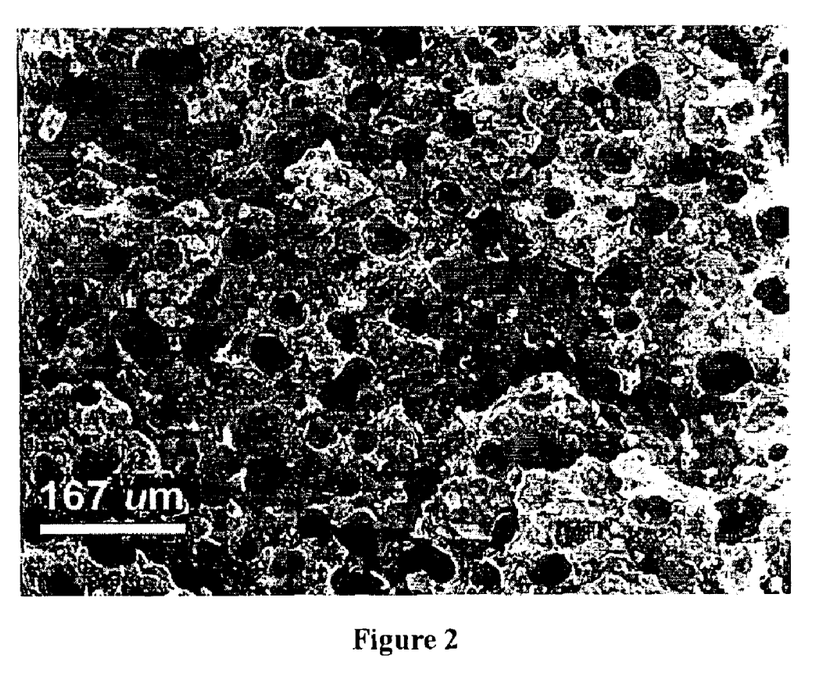
FIG. 2 is a cross-sectional scanning electron microscope (SEM) image of unsintered Al—Cu foam fabricated according to this method showing closed cell porosity.

Generally, the closed porosity in the structures is formed in the component part generally during the finishing processes, which involve heating the object to remove at least a part of the minor phase leaving internal voids in the structure to provide the closed porosity as seen in FIG. 2. As previously explained, closed porosity in a structure is not accessible to the outside and is completely enclosed in the final structure. Modifications in the burnout schedule may be desired to further optimize the pore-size. For metallic and cermet foams, it may be preferable to perform the binder burnout in either flowing nitrogen or flowing nitrogen with about 5% hydrogen, and the components may be supported in a powder bed of titanium sponge held in a ceramic crucible. Preferably, the crucible is made of alumina, though other crucible materials may be used.

The temperature required for binder burnout varies with the materials used. Generally, ceramic and cermet structures require higher temperatures but shorter time periods than temperatures required for metallic foams. By way of example, PMMA requires temperatures in the range of about 430° C. to about 450° C. while EVA and EEA type polymers require temperatures in the range of about 600° C. to about 630° C.

Further, depending on the compositions, a cycling burnout schedule may be used to achieve desired results and to increase closed porosity. Cycling binder burnout schedules involve incremental raises in the temperature, each followed by holding at a specific temperature. Preferably, cycling burnout schedules with incremental temperature changes and holding at certain temperatures, as opposed to heating at one constant temperature, are used. The cycling burnout schedule, including the amount of incremental temperature increase as well as the maximum temperature required, will depend on the particular materials used.

Figure 3:
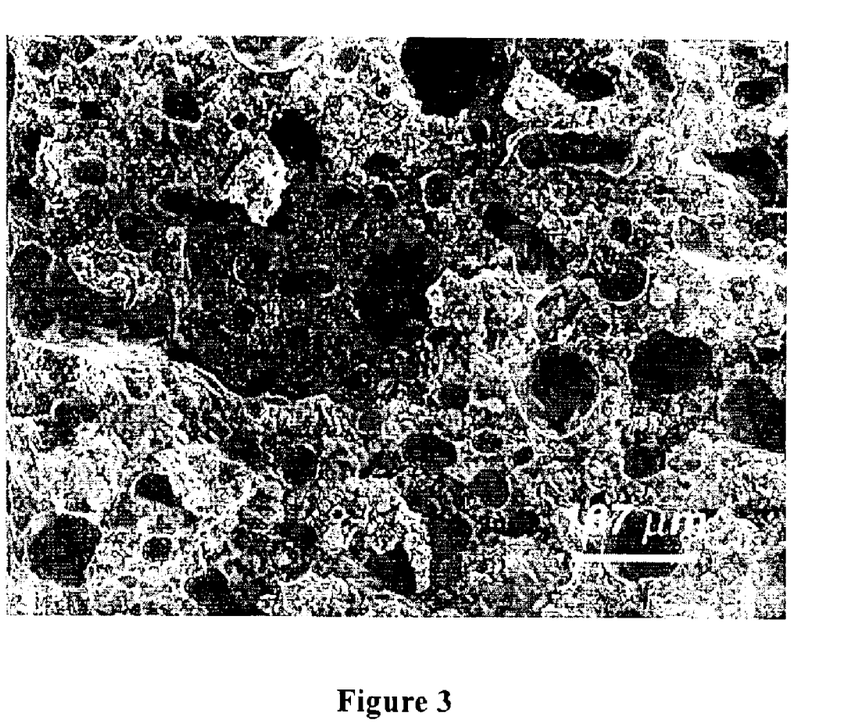
FIG. 3 is a cross-sectional SEM image of an aluminum foam fabricated according to this method showing closed cell porosity and showing the larger pore sizes formed after exposure to a higher temperature.

By way of example, for metallic foams, the amount of closed porosity in the structure may increase with holding the burnout temperature at about 150° C. to about 190° C. This temperature is dependent on the temperature stability of the minor phase. Burnout cycles are typically completed by about 450° C., which is well below the temperature required for the sintering temperature of the foam components. Further, pore size increases with increasing time of exposure and temperature in the range of about 150° C. to about 190° C. This is shown by comparing the size of the pores in FIGS. 2 and 3. Compared to the porosity size in FIG. 2, which was heated at about 150° C., holding the temperature at 190° C. for the same time duration yielded larger porosity, as shown in FIG. 3. Similar effects would likely be observed with a longer hold time at the same temperature.

The binder burnout process may be followed by furnace cooling. After furnace cooling, the component can be sintered to fully consolidate the component. The sintering temperature depends on the type of metallic, ceramic, or cermet powder used as well as whether a sintering aid was used. Typically, the sintering temperatures necessary for ceramic and cermet foams are higher than those necessary for metallic foams. By way of example, for SiC foams the sintering temperature is typically about 1850° C., for $Si_3N_4$ foams the sintering temperature is typically about 1750° C., for aluminum foams the sintering temperature is typically about 625° C., for aluminum alloys the sintering temperature is typically about 625° C. to about 650° C., for copper alloys the sintering temperature is typically about 850° C. to about 950° C., and for stainless steel the sintering temperature is typically about 1250° C. to about 1350° C.

A predetermined degree of closed and open porosity may be achieved through this invention depending on the materials and specific methods used. The porosity levels and the pore sizes can be controlled by the powders, binders and minor phase components chosen and are related to the hold temperature during the binder burnout stage. Foam structures fabricated according to this invention typically have closed porosity up to about 70%, and preferably between about 20% to about 70%. Although porosity levels greater than about 70% can be achieved, such porosity levels may begin to adversely impact the strength and durability of the structures. Preferably, the size of the closed pores ranges from about 30 $\mu$m to about 150 $\mu$m, though larger and smaller pores may be fabricated. For example, if microspheres are used for the minor phase, the size of the resultant pores is related to the size of the microspheres used. Thus, by way of example, 100 $\mu$m microspheres will typically create closed pores about 100 $\mu$m after burnout and sintering of the object.

Foam structures having spherical closed porosity with higher aspect ratios can be fabricated. Spherical closed porosity provides better energy absorption capability than currently available foams with irregular or hexagonal shaped open cells. Closed porosity provides improved energy absorption capabilities as compared to open porosity. This is closely related to the aspect ratio of the cells themselves, the aspect ratio being the cell wall thickness divided by the length of the cell. Circular cells have the capability to absorb more impact energy than hexagonal cells that are intrinsically unstable. Spheroidal cell walls are thicker on average, and the reduced section thickness is too short to lead to compressive instability. In fact, spheroidal walls may experience some plastic deformation prior to cell wall rupture. The size, distribution, and aspect ratio of closed-celled porosity in a foamed material can have a direct effect on its energy absorbing and blast amelioration capability and other mechanical properties such as compressive strength.

The amount of open porosity desired is dependent on the specific application. For example, it may be desirable in certain applications for ceramic foams to have very low open porosity. Further, it may be desirable in other applications for metallic foams to have both open and closed porosity. The structures preferably have open porosity ranging from about 0% to about 70%. For many applications and to provide the benefits of open porosity while maintaining the structural integrity of the object, the open porosity should typically be between about 30% to about 70%, with pore sizes ranging between about 100 $\mu$m to about 1000 $\mu$m or larger.

Figure 4:
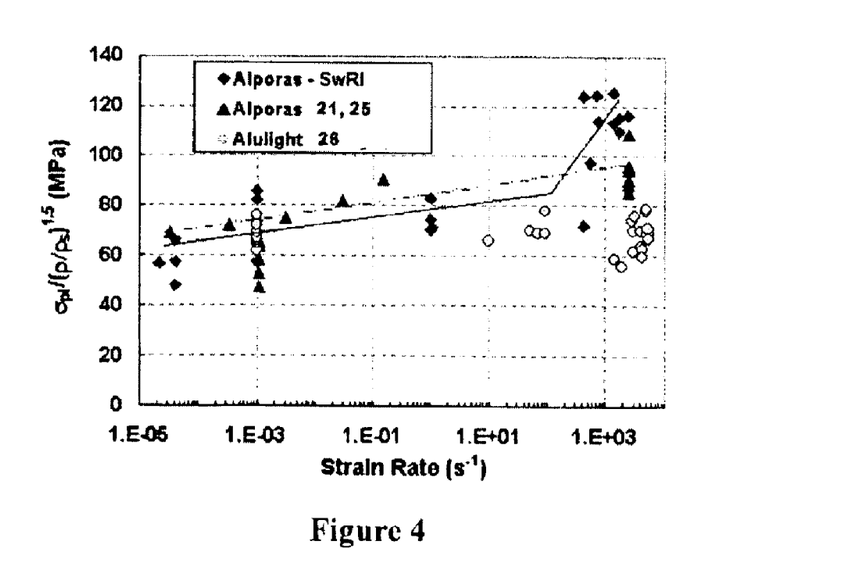
FIG. 4 is a plot showing normalized stress verses strain rate for ALPORAS and ALULIGHT foams showing strain rate dependence for the higher density ALPORAS closed cell foam.

Without wishing to be bound by any theories, it is believed that higher density and higher specific strength closed-cell foam materials provide improved energy absorption as compared to open-celled foams or low-density closed-cell foams. The increased energy absorption capability is directly related to the increases in plateau stress and strain. This effect is believed to be due to the spheroidal cell walls being thicker on average and the reduced section thickness being too short to lead to cell wall buckling. For the same density, a foam material with a higher amount of closed-cell porosity will also generally have a higher compressive strength compared to an open-cell porous material, which is much weaker than a closed-cell foam material with the same amount of porosity. For example, the strain rate dependence of yield strength for closed cell ALPORAS foam is shown in FIG. 4. In this figure, the y-axis in the plot is the normalized plateau stress. It is normalized based on the relative density of the specific foams. The other types of foams shown in FIG. 4 are of the open porosity variety.

The following examples are intended to illustrate the present invention and should not be construed as in any way limiting or restricting the scope of the present invention. The following examples illustrate formulations of the composites that can be used in preparing metallic, ceramic, and cermet foams. Further, some of the examples illustrate burnout schedules that can be used to achieve sufficient porosity.

EXAMPLES

Example 1

This example illustrates a blend formulation that can be used to make metallic foam. As shown in Table I, aluminum powder was blended with copper powder to produce an Al-4 wt % Cu alloy blend. The copper powder was added to the aluminum powder to create an alloy composition that would be more readily sinterable than pure aluminum alone. The aluminum and copper powders were similar in size. The Al and Cu powders were approximately 45 μm size particles, with an average particle size of 10 μm. The polymer (water-soluble) is a multi-component mixture. It was first melted in a Brabender high-shear mixer and the aluminum-copper powder mixture was then added as carefully as possible.

TABLE I

| Batch Size (cc): | | | 42 | |
| Batch Temperature (C.): | | | 150 | |
| Batch Speed (rpm): | | | 60 | |

| | Density g/cc | Weight (W) % | Volume (V) % | Actual V | Actual W (g) |
| --- | --- | --- | --- | --- | --- |
| Aluminum | 2.702 | 95.5 | 0.542 | 22.78 | 61.54 |
| Copper | 8.96 | 4.5 | 0.008 | 0.32 | 2.90 |
| PMMA | 1.14 | | 0.450 | 18.90 | 21.94 |
| Total | | 100 | 1.000 | 42.00 | 86.38 |

After compressing the composite blend into feed rods, they were extruded at temperatures of about the 225–250° C. Next, the binder burn-out was performed using either flowing nitrogen or flowing nitrogen with 5% hydrogen, followed by furnace cooling. Using this formulation, the cycling binder burnout schedule in Table II was used.

TABLE II

| Temperature Range (° C.) | Temperature Increase Increment | Total Time (hr) |
| --- | --- | --- |
| 30–270 | 30° C. | 8 |
| Hold | — | 2 |
| 270–400 | 10° C. | 13 |
| Hold | — | 1 |
| 400–430 | 30° C. | 1 |
| Hold | — | 1 |

FIG. 2 shows a cross-sectional scanning electron microscope image of an aluminum foam with closed porosity fabricated according to this invention.

Example 2

This example illustrates another blend formulation that can be used to make metallic foam. As shown in Table III, aluminum was used as the primary metallic powder with small amounts of Mg and Sn added to the aluminum in an effort to reduce oxide layers formation on the metallic powder. In this example, the composite blend contained 8 wt % of Mg and 8 wt % of Sn. Additionally, Mg and Sn form a eutectic alloy with Al well below the maximum binder burnout temperature, thus allowing the foam material sufficient structural rigidity to be handled between the binder burnout and sintering steps.

This formulation used the polymethylmethacrylate (PMMA) as the polymer binder. Although PMMA has a relatively high viscosity, it was used as the polymer binder because it has clean burn-off characteristics. In this example, the xylene also served to reduce the viscosity of the PMMA.

TABLE III

| Material | Density (gm/cc) | Volume % | Weight % | Weight (gm) |
| --- | --- | --- | --- | --- |
| Al | 2.702 | 43.75 | 67.1 | 49.65 |
| Sn | 7.31 | 1.25 | 6.2 | 4.6053 |
| Mg | 1.738 | 5.00 | 4.7 | 3.46731 |
| PMMA | 1.1 | 35.25 | 22.0 | 16.2855 |
| Xylene | 0.86 | 14.75 | 7.2 | 5.3277 |
| Totals | | 100.00 | 100% | 74.01 |

Figure 5:
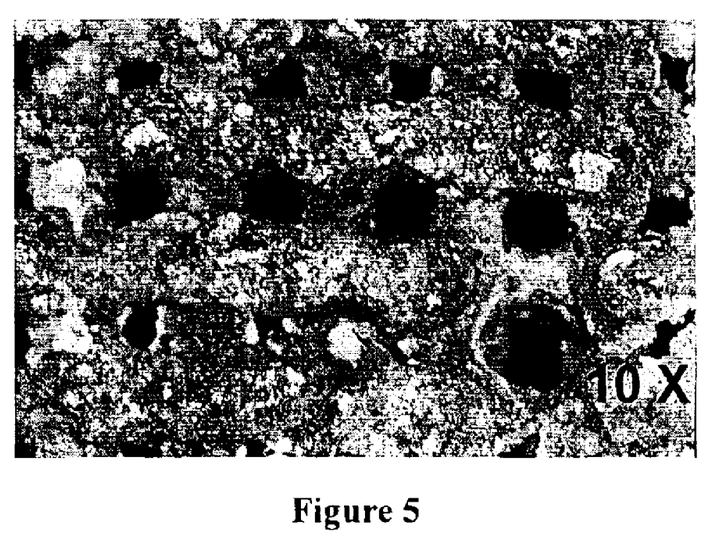
FIG. 5 shows open porosity from a fully sintered aluminum foam sample.

After compressing the composite blend into feed rods, they were extruded at temperatures of about 225–250° C. The extrusion process was observed to watch for breakdown of the binder system in this temperature range. Next, the binder burn-out was performed using either flowing nitrogen or flowing nitrogen with 5% hydrogen, followed by furnace cooling. Using this formulation, the cycling binder burnout schedule in Example 1 was successfully used. FIG. 5 shows the open porosity of a fully sintered aluminum foam component with the composition in Table III using the binder burnout schedule from Table II after sintering at 625° C. in flowing nitrogen.

Example 3

Metallic foam components were made using the formulation in Table IV. The major binder phase was PMMA and the minor binder phase was butyl oleate. The same general procedure as in the previous examples was used with this formulation.

TABLE IV

| Material | Density (gm/cc) | Volume % | Weight % | Weight (gm) |
|---|---|---|---|---|
| Al | 2.702 | 43.75 | 62.6 | 49.65 |
| Sn | 7.31 | 1.25 | 4.84 | 3.84 |
| Mg | 1.738 | 5.00 | 4.60 | 3.65 |
| PMMA | 1.1 | 40.00 | 23.29 | 18.48 |
| Al 3 wax | 0.92 | 5.00 | 2.43 | 1.93 |
| Butyl Oleate | 0.855 | 5.00 | 2.27 | 1.8 |
| Totals | | 100.00 | 100% | 79.35 |

Further, this formulation permitted the use of enhanced extrusion forces and the use of a smaller extrusion tip with a 0.016" extrusion nozzle. Prior to extrusion, the feedrods were heat treated at 100° C. for 2 hours. This formulation was successfully extruded at 170° C. and 275–300% flow. This formulation and extrusion conditions provided a smoother surface finish after extrusion.

The burnout schedule, shown below in Table V, was used for this formulation. The hold times listed in Table V can be adjusted in proportion to the dimensions of the sample. The burnout was performed in either flowing nitrogen or flowing nitrogen with 5% hydrogen, followed by cooling. Depending on the shape and configuration of the sample, it may be necessary to pack the samples during both the binder burnout and sintering stages. Titanium sponges and alumina crucibles can be used to pack the samples.

TABLE V

| Temperature Range (° C.) | Temperature Increase Increment | Total Time (hr) |
|---|---|---|
| 30–170 | 20° C. | 7 |
| Hold | — | 2 |
| 170–270 | 25° C. | 4 |
| Hold | — | 2 |
| 270–400 | 10° C. | 13 |
| Hold | — | 1 |
| 400–430 | 15° C. | 2 |
| Hold | — | 1 |

Figure 6:
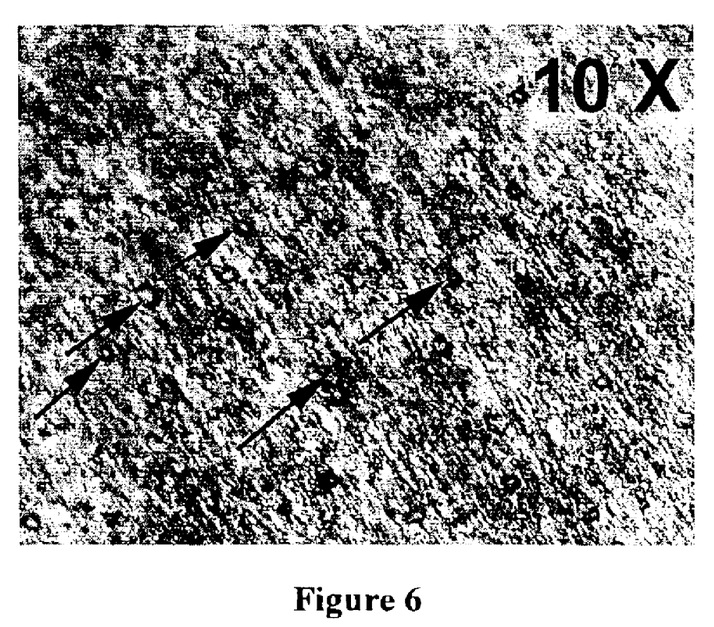
FIG. 6 is a longitudinal cross-sectional view of a fully sintered aluminum foam sample sintered to 625° C. in flowing nitrogen, showing closed porosity.
Figure 7:
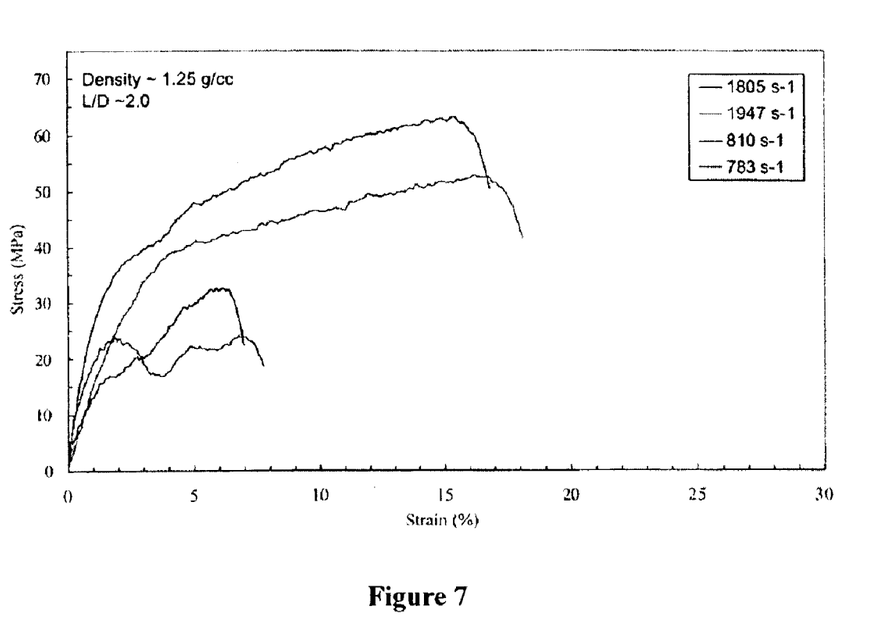
FIG. 7 is a plot showing Split Hopkins Pressure Bar (SHPB) compression test results at high strain rates for aluminum foam fabricated according to this invention with L/D ~2.0 and density ~1.25 g/cc.
Figure 8:
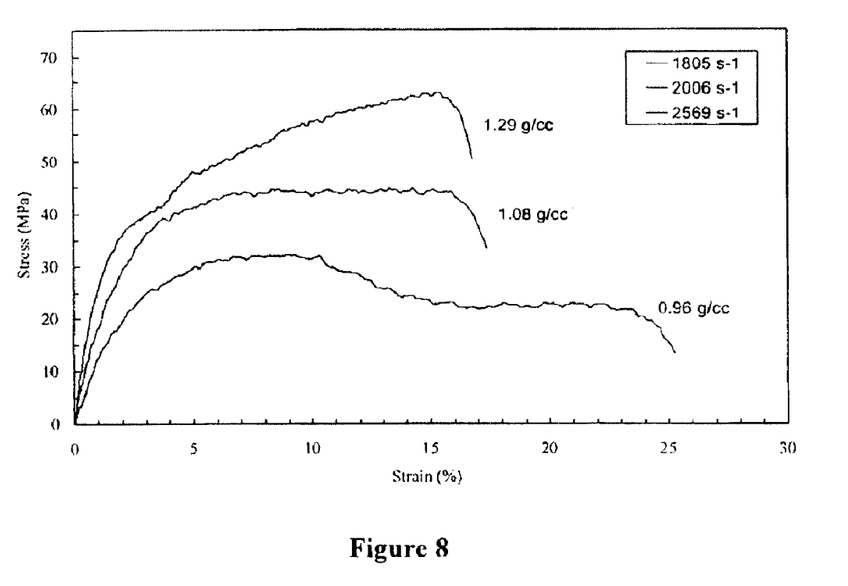
FIG. 8 is a plot of SHPB compression tests conducted at high strain rates as a function of density, showing the effect of density.
Figure 9:
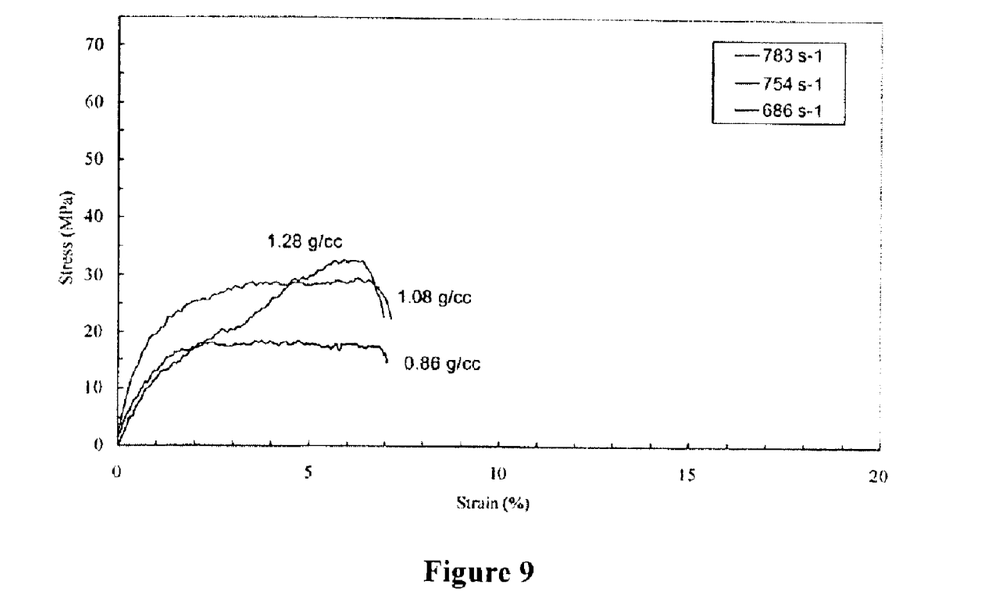
FIG. 9 is a plot of SHPB compression tests conducted at slower strain rates compared to samples in FIG. 8, which show the effect of density.

FIG. 6 shows a longitudinal cross-sectional view of a fully sintered aluminum foam sample according to this example. Dynamic Split Hopkins Pressure Bar (SHPB) strain rate test results obtained from this formulation are similar to those shown in FIGS. 7 through 9.

Example 4

This example illustrates a blend formulation for a ceramic foam as shown in Table VI.

TABLE VI

| Constituent | Density (g/cc) | Vol % | (Partial den) | Wt % |
|---|---|---|---|---|
| $Si_3N_4$ | 3.21 | 46.46 | 1.48 | 68.95 |
| $Y_2O_3$ | 3.26 | 1.00 | 1.51 | 1.51 |
| MoC | 9.18 | 0.04 | 4.24 | 0.15 |
| $SiO_2$ | 2.65 | 0.00 | 1.23 | 0.00 |
| $Al_2O_3$ | 3.97 | 2.50 | 1.84 | 4.59 |
| BLO | 1.12 | 26.50 | 0.52 | 13.72 |
| HODA | 1.01 | 21.00 | 0.47 | 9.81 |
| MAPHOS 8135 | 1.20 | 0.89 | 0.55 | 0.49 |
| PS-2 | 1.05 | 1.61 | 0.49 | 0.78 |
| Totals | 2.16 | 100.00 | | 100.00 |

For this formulation, the $Si_3N_4$ was first combined with the $Y_2O_3$ and the $Al_2O_3$, which are the sintering aids, as well as with the MoC and the $SiO_2$, which were added to increase the wear resistance. The mixture was milled for between 48 to 96 hours in an ethanol medium. The ethanol was then evaporated, and the powder was dried. The powder was then divided into 5–6 equal batches, and then it was added to the BLO-HODA mixture with ceramic milling media, and mixed in a container that was rolled on a rolling mill to ensure uniformity of mixing of the contents. After milling for approximately 2–3 hours, the surfactants, PS-2 and MAPHOS 8135, were added to reduce the viscosity of the composition. After further milling for approximately 1 hour, the microballoon particles were added. The gelling agents (initiator and catalyst) were added.

Figure 10:
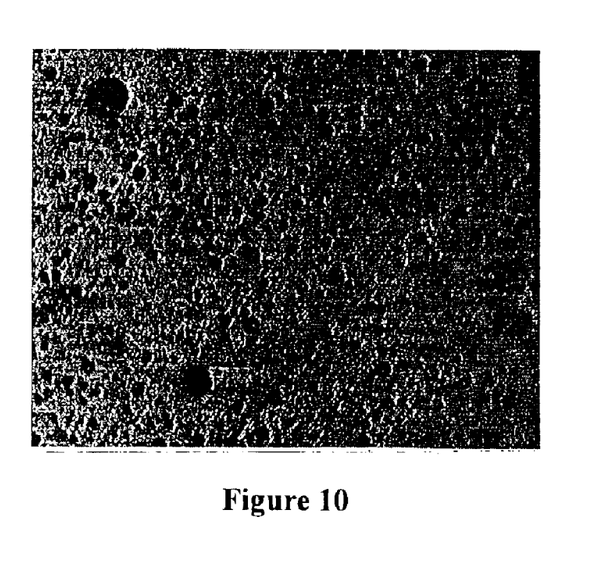
FIG. 10 is a cross-sectional SEM image of a fully sintered $Si_3N_4$ ceramic foam sample showing closed porosity.

The slurry was then poured into the mold. Further vacuum was applied to remove any air trapped inside to gel the slurry. The gelled part was then removed from the mold. After binder burnout and sintering, an object with closed porosity was fabricated, as shown in FIG. 10.

Example 5

This example illustrates a blend formulation for a cermet foam as shown in Table VII. The same general procedure as in the previous example was used with this formulation.

TABLE VII

| Constituent | Density (g/cc) | Vol % | (Partial den) | Wt % |
|---|---|---|---|---|
| WC/Co 6% | 14.960 | 55.00 | 1.72 | 94.47 |
| BLO | 1.12 | 22.00 | 0.13 | 2.83 |
| HODA | 1.01 | 20.00 | 0.12 | 2.32 |
| MAPHOS 8135 | 1.20 | 1.00 | 0.14 | 0.14 |
| PS-2 | 1.05 | 2.00 | 0.12 | 0.24 |
| Totals | 8.71 | 100.00 | | 100.00 |

The WC—Co powder was divided into 5–6 equal batches. The powder was added to the BLO-HODA mixture with ceramic milling media, and mixed in a container that was rolled on a rolling mill to ensure uniformity of mixing of the contents. After milling for approximately 2–3 hours, the surfactants such as PS-2 and MAPHOS 8135 were added to reduce the viscosity of the composition. After further milling for approximately 1 hour, microsphere particles were added. The gelling agents (initiator and catalyst) were added.

Figure 11:
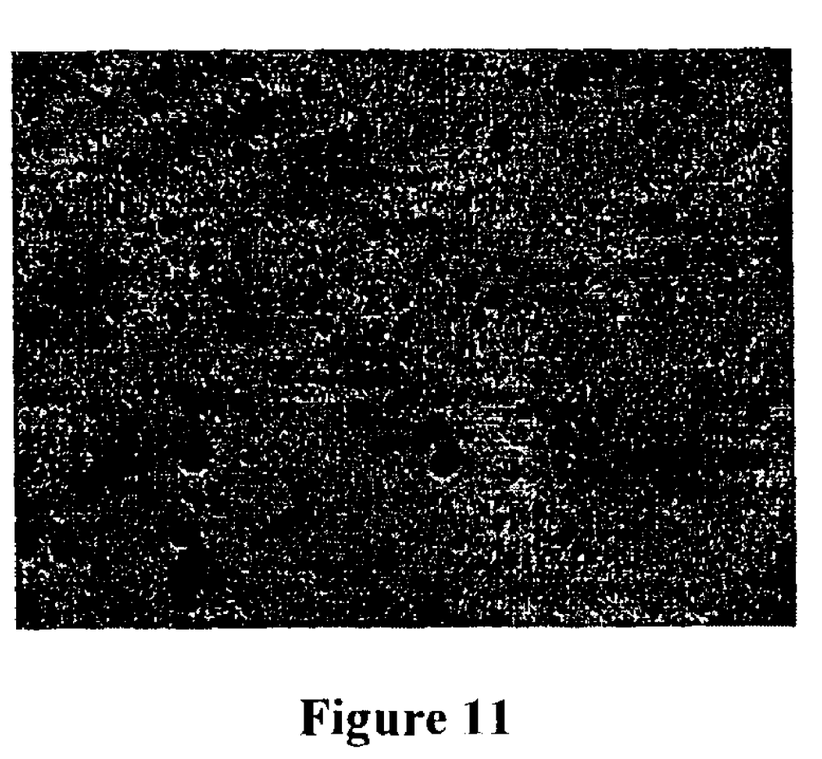
FIG. 11 is a cross-sectional SEM image of a fully sintered cermet (WCCo) foam sample showing closed porosity.

The slurry with the gelling agents was poured into the mold. After binder burnout and sintering, a cermet foam object with closed porosity was obtained, as shown in FIG. 11.

Numerous modifications and variations may be made in the techniques and structures described and illustrated herein without departing from the spirit and scope of the present invention. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:

1. A method of fabricating a porous object comprising, in combination:

(a) mixing structure forming powder, binder, and a pore forming compound to provide a flowable composition, wherein the pore forming compound is generally immiscible with the structure forming powder and binder;

(b) gelling the flowable composition in a mold to form a composite object; and (c) heating the composite object to a temperature and for a time effective for removing at least an amount of the pore forming compound to generate one or more pores and thereby provide a sintered object having internal porosity.

2. The method of claim 1 wherein the structure forming powder and binder are mixed to form a generally uniform composition and wherein the pore forming compound is subsequently mixed with the composition.

3. The method of claim 1 wherein the pore forming compound is present in the flowable composition as discrete droplets of regular or irregular shape or combinations thereof.

4. The method of claim 1 wherein the structure forming powder is selected from the group consisting of metal powder, ceramic powder, cermet powder and combinations thereof.

5. The method of claim 1 wherein the pore forming compound is a polymeric compound.

6. The method of claim 5 wherein the pore forming compound is selected from the group consisting of polymethyl methacrylate, ethyl vinyl acrylate, polyethylene ethacrylate, poly-2-ethyl-2-oxazoline, polyethylene glycol, polystyrene, microcellulose, butrylactone, hexanedioldiacrylate, and combinations thereof.

7. The method of claim 1 wherein the flowable composition includes one or more compounds for enhancing the processability of the flowable composition.

8. The method of claim 1 wherein the flowable composition includes one or more compounds for enhancing the material properties of the sintered object.

9. A structure formed by the method of claim 1.

10. A method of fabricating a porous object comprising, in combination:

(a) mixing structure forming powder, binder, and microspheres to provide a flowable composition;

(b) gelling the flowable composition in a mold to form a composite object; and (c) heating the composite object to a temperature and for a time effective for providing a sintered object having internal porosity defined at least in part by one or more of the microspheres.

11. The method of claim 10 wherein the structure forming powder and binder are mixed to form a generally uniform composition and wherein the microspheres are subsequently mixed with the composition.

12. The method of claim 10 wherein the structure forming powder is selected from the group consisting of metal powder, ceramic powder, cermet powder and combinations thereof.

13. The method of claim 10 wherein the microspheres are hollow ceramic microspheres.

14. The method of claim 10 wherein the microspheres are polymeric microspheres and wherein at least an amount of the polymeric micro spheres are removed during heating to provide pores within the object.

15. The method of claim 10 wherein the flowable composition includes one or more compounds for enhancing the processability of the flowable composition.

16. The method of claim 10 wherein the flowable composition includes one or more compounds for enhancing the material properties of the sintered object.

17. A structure formed by the method of claim 10.

18. A method of fabricating a porous object comprising, in combination:

(a) mixing structure forming powder, binder, and microspheres to provide an extrudable composition;

(b) extruding the extrudable composition through a dispensing head;

(c) depositing the extrudable composition onto a working surface in a predetermined manner to form a composite object; and (d) heating the composite object to a temperature and for a time effective for providing a sintered object having internal porosity defined at least in part by one or more of the microspheres.

19. The method of claim 18 wherein the structure forming powder and binder are mixed to form a generally uniform composition and wherein the microspheres are subsequently mixed with the composition.

20. The method of claim 18 wherein the structure forming powder is selected from the group consisting of metal powder, ceramic powder, cermet powder and combinations thereof.

21. The method of claim 18 wherein the micro spheres are hollow ceramic microspheres.

22. The method of claim 18 wherein the microspheres are polymeric microspheres and wherein at least an amount of the polymeric microspheres are removed during heating to provide pores within the object.

23. The method of claim 18 wherein the flowable composition includes one or more compounds for enhancing the processability of the flowable composition.

24. The method of claim 18 wherein the flowable composition includes one or more compounds for enhancing the material properties of the sintered object.

25. The method of claim 18 wherein the extrudable composition is deposited onto the working surface in one or more layers in a matrix arrangement having structural porosity for increasing the surface area of the composite structure.

26. A structure formed by the method of claim 18.

27. A method of fabricating a porous object comprising, in combination:

(a) mixing structure forming powder, binder, and a pore forming compound to provide an extrudable composition, wherein the pore forming compound is generally immiscible with the structure forming powder and binder;

(b) extruding the extrudable composition through a dispensing head;

(c) depositing the extrudable composition onto a working surface in a predetermined manner to form a composite object; and (d) heating the composite object to a temperature and for a time effective for removing at least an amount of the pore forming compound to generate one or more pores and thereby provide a sintered object having internal porosity.

28. The method of claim 27 wherein the structure forming powder and binder are mixed to form a generally uniform composition and wherein the pore forming compound is subsequently mixed with the composition.

29. The method of claim 27 wherein the pore forming compound is present in the flowable composition as discrete droplets of regular or irregular shape or combinations thereof.

30. The method of claim 27 wherein the structure forming powder is selected from the group consisting of metal powder, ceramic powder, cermet powder and combinations thereof.

31. The method of claim 27 wherein the pore forming compound is a polymeric compound.

32. The method of claim 27 wherein the pore forming compound is selected from the group consisting of polymethyl methacrylate, ethyl vinyl acrylate, polyethylene ethacrylate, poly-2-ethyl-2-oxazoline, polyethylene glycol, polystyrene, microcellulose, butrylactone, hexanedioldiacrylate, and combinations thereof.

33. The method of claim 27 wherein the flowable composition includes one or more compounds for enhancing the processability of the flowable composition.

34. The method of claim 27 wherein the flowable composition includes one or more compounds for enhancing the material properties of the sintered object.

35. The method of claim 29 wherein the droplets of pore forming compound become elongated and directionally aligned during extrution.

36. The method of claim 27 wherein the extrudable composition is deposited onto the working surface in one or more layers in a matrix arrangement having structural porosity for increasing the surface area of the composite structure.

37. A structure formed by the method of claim 27.

* * * * *